United States Patent [19]

Bakul et al.

[11] 4,097,274

[45] Jun. 27, 1978

[54] METHOD OF MAKING SUPERHARD ARTICLES

[76] Inventors: Valentin Nikolaevich Bakul, ulitsa Kirova 34a, kv. 12; Igor Ivanovich Bilyk, ulitsa Radomyshlskaya 32, korpus 2, kv. 60; Dolores Khaimovna Bronshtein, ulitsa Scherbakova 45, kv. 8; Ivan Fedorovich Vovchanovsky, ulitsa Bulvar Lesi Ukrainki 5, kv. 119; Nekhemian Veniaminovich Tsypin, ulitsa Dorogozhitskaya 26, kv. 59, all of Kiev, U.S.S.R.

[21] Appl. No.: 688,002

[22] Filed: May 19, 1976

Related U.S. Application Data

[63] Continuation of Ser. No. 519,273, Oct. 30, 1974, abandoned.

[51] Int. Cl.$^2$ .............................................. B22F 1/04
[52] U.S. Cl. .................................. 75/201; 75/200; 75/226; 75/243
[58] Field of Search ............... 75/200, 201, 226, 243; 423/446

[56] References Cited

U.S. PATENT DOCUMENTS

| 2,216,908 | 10/1940 | DeBats | 51/309 |
| 3,241,956 | 3/1966 | Inove | 75/200 |
| 3,819,814 | 6/1974 | Pope | 75/201 |

*Primary Examiner*—Benjamin R. Padgett
*Assistant Examiner*—Josephine L. Barr
*Attorney, Agent, or Firm*—Holman & Stern

[57] ABSTRACT

A superhard article is produced by heating in two steps a mixture of a hard-alloy matrix material and diamond grains less than 1 mm in size in a graphite press mould. During the first heating step, the mixture is heated to a temperature of 1,200° C at a rate of 1,000°–1,100° C per minute by heating the press mould by high frequency. During the second heating step, the mixture is heated to the sintering temperature, up to 1,800° C at a rate of 3,000°–10,000° C per minute by heating the mixture by the resistance method, i.e. by passing electric current through the mixture while simultaneously heating the press mould by high frequency currents.

2 Claims, No Drawings

METHOD OF MAKING SUPERHARD ARTICLES

This is a continuation of application Ser. No. 519,273 filed Oct. 30, 1974, now abandoned.

BACKGROUND OF THE INVENTION

The present invention relates to a method of producing a superhard material including diamond or borazon as the superhard component and a hard-melting carbide with a "cementing" component as the matrix material. In particular, tungsten carbide and cobalt, chrome carbide and nickel, or tungsten carbide and nickel may be employed as the matrix material.

The superhard material, according to the invention, can be used for reinforcing various types of well-drilling, dressing and other tools working under conditions of excessive abrasive wear, as well as various parts of measuring, metal-working and other equipment.

Known in the prior art are methods (see, for example U.S. Pat. Nos. 2,712,988 and 2,216,908; FRG Patent No. 611,868; and British Patent No. 349,732) of manufacturing articles from superhard materials by simultaneously heating and applying pressure to a sintered composition, i.e., by the method of hot pressing.

Experiments conducted by the inventors have revealed that when heated, diamonds react readily with adjacent metals, forming therewith solid solutions or carbides. In this case, the rate of the reaction varies substantially depending on the temperature and duration of the heating.

For instance, at a temperature of 1,460° C (the temperature of sintering a hard-alloy in cobalt), a diamond grain 1–2 mm in size may be dissolved within 20 minutes. Evidently, when a material containing finer grains, e.g. 250 microns in size, has to be produced, the surface area of the grains, corresponding to one carat, is by one order greater in this case, hence, these grains will disintegrate practically within 2–5 minutes. The tolerable loss of diamonds in the course of preparing the superhard material must not exceed 1% by weight, this being the only condition under which reliable binding of the diamond grain and, consequently, the high durability of the tool being made are ensured.

The prior art methods, as disclosed in the above patents, have no specified time interval for conducting the hot pressing process. Only in one patent (U.S. Pat. No. 2,216,908) is there an indication that, for pressing a material heated by high-frequency currents, exposures of about 10 minutes should be used.

In the course of preparing most superhard materials with high endurance properties, which forms the subject of the present invention, such long exposures are not tolerable. This becomes evident in view of the above considerations as well as in view of the fact that diamond grains used in the present superhard material are less than 1 mm in size.

Moreover, in the case of induction heating, the press mould is heated by the article being manufactured, which means that in order to rapidly attain the required sintering rate, the article has to be overheated, this being a serious disadvantage of the prior art method.

SUMMARY OF THE INVENTION

It is therefore an object of the present invention to provide a method of producing superhard articles featuring high durability, resistance to wear and excellent cutting properties.

Another object of the invention is to provide a method which will ensure high durability and other useful properties of the articles, no matter how small the diamond grains used in the composition being sintered.

Still another object of the invention is to provide a method of producing superhard articles, which is easily realizable without any additional costs as compared with conventional methods.

With these and other objects, in view in accordance with the present invention, a method of producing a superhard article consists of hot pressing a mixture of diamond grains less than 1 mm in size and a hard-alloy matrix material in a graphite press mould at a temperature of up to 1,800° C. The mixture is heated stepwise, first to a temperature of 1,200° C at a rate of 1,000°–1,100° C per minute by heating the press mould by high-frequency currents, and then to the final sintering temperature at a rate of 3,000°–10,000° C per minute by simultaneously heating the press mould by high-frequency currents and the mixture by the resistance method, i.e. by passing a current through the mixture.

This method avoids overheating the sintered composition and produces superhard articles having high durability and cutting properties.

According to an alternative embodiment of the present invention, the proposed method is further characterized by keeping the mixture within the press mould at 1,200° C for up to 2 minutes, and then at the sintering temperature for no more than 2–3 sec.

This novel feature provides for a most optimum rate of sintering of the hard-alloy composition.

DETAILED DESCRIPTION OF THE PREFERRED EMBODIMENT

Given below is a detailed description of the present invention in conjunction with illustrative examples.

The present invention resides in heating an article from a superhard material to a temperature of 1,200° C at a rate of 1,000°–1,100° C per minute under a specific pressure of 50–100 kg/cm$^2$, and then keeping the article under these conditions for up to 2 minutes to ensure the physico-chemical processes involved in the sintering of the matrix material, such as the dissolution of carbon and tungsten in cobalt.

Further heating of the article to the sintering temperature is carried out at a rate of 3,000°–3,100° C per minute under a specific pressure of 100–200 kg/cm$^2$ followed by keeping the article at this temperature for 2–3 sec.

The present invention is particularly advantageous in that the high quality of the articles produced from the superhard material is ensured through graphitization of the diamond, and its reaction with the matrix material is practically non-existent before the temperature of 1,200° C is reached, with the following sintering process being accelerated, i.e. a 12–15 sec. period is too short for the above processes to occur. The graphite press mould containing the mixture of the diamond grains and the hard-alloy matrix material is heated to a temperature of 1,200° C by the induction method, by high-frequency currents, and from 1,200° C to the sintering temperature, at higher rates, i.e. the press mould (induction method) and the mixture (passing current directly through the mixture) are heated simultaneously.

When the hot pressing process is completed, the press mould together with the material sintered therein is cooled to 750°–800° C under pressure and then slow cooled in a sand containing chamber (low temperature oven).

The process of manufacturing a tool cutting edge ($\phi$ 10×10 mm) from the superhard material for reinforcing tools, in accordance with the present invention, may be illustrated by the following example: Diamond powders with a grain size of 630/500 microns were taken in an amount of 3.5 carats per 9 g of a powdered hard-alloy composition including 94% of tungsten carbide and 6% of cobalt.

The diamond powders and the hard-alloy matrix material were mixed thoroughly to ensure even distribution of the diamond grains throughout the entire volume of the matrix material, and then the mixture was charged into a graphite press mould with a cylindrical cavity 10 mm in diameter.

The press mould was placed onto a hot moulding press. The operating pressure was about 200 kg/cm$^2$. The mixture was heated by high-frequency currents at a rate of 1,000°–1,100° C per minute. The heating temperature was determined depending on the material of the mould cavity.

The mixture was kept under pressure for 0.5–2 minutes. Then, the article was cooled to a temperature of 750°–800° C in the press and cooled in the sand containing chamber.

Thus, the herein disclosed method of producing diamond tools has the following advantages:

1. The valuable properties of diamonds are preserved due to reducing the time required to make a diamond tool.

2. Increasing the sintering temperature makes it possible to extend the range of metals and alloys thereof which can be used in the manufacture of dies for diamond tools.

3. Less time is required to manufacture a tool, whereby the yield of the finished articles is substantially increased.

The proposed method is applicable for manufacturing other articles from superhard materials, such as friction components reinforced with diamonds.

What is claimed is:

1. A method of producing a superhard article comprising the steps of: charging a mixture of diamond grains less than 1 mm in size and a hard-alloy matrix material into a graphite press mould with the diamond grains being evenly distributed throughout the hard-alloy matrix material; heating the mixture under a pressure of from 50 to 100 kg/cm$^2$ to 1,200° C at a rate of from 1,000° to 1,100° C per minute by passing high frequency currents through the press mould; maintaining the mixture in the press mould at 1,200° C for less than 2 minutes to preclude graphitization and dissolution of the diamond grains; heating the mixture under a pressure of from 100 to 200 kg/cm$^2$ to a sintering temperature less than 1,800° C at a rate of from 3,000° to 10,000° C per minute by simultaneously passing a current through the mixture and passing high frequency currents through the press mould; and maintaining the mixture in the press mould at the sintering temperature for a period of from 2 to 3 seconds.

2. The method as claimed in claim 1, wherein the mixture is heated from 1,200° C to the sintering temperature at a rate of from 3,000° to 3,100° C per minute.

* * * * *